3,351,429
PRODUCTION OF TITANIUM DIBORIDE

Peter Leslie Timms, Thornton Heath, Surrey, England, assignor to United States Borax and Chemical Corporation, Los Angeles, Calif.
No Drawing. Filed May 10, 1962, Ser. No. 194,216
Claims priority, application Great Britain, May 15, 1961, 17,686/61
6 Claims. (Cl. 23—204)

This invention relates to the production of titanium diboride by the high temperature reaction of titanium dioxide, boric oxide and carbon.

This reaction is believed to proceed according to the equation:

$$TiO_2 + 5C + B_2O_3 = TiB_2 + 5CO$$

It may be carried out at temperatures of 1350° C. and upwards, although in an atmosphere of carbon monoxide pure titanium diboride is not formed below about 1550° C. In practice, however, it is advantageous to operate at even higher temperatures, e.g. up to about 2000° C. Suitable furnaces in which the reaction can be carried out, which normally comprise a graphite tube as a reaction chamber, are expensive to construct and operate and it is important to make the most economical use of the heat employed. Because the reaction is endothermic, it is difficult to achieve this economy and this has hitherto been considered to be a serious disadvantage of the process.

It has previously been suggested that satisfactory operation depended on holding the reactants in boats or saggers, both of which waste available heat. An alternative proposal to carry out the reaction with the starting materials in the form of a slug made by heating a mixture of boric oxide, titanium dioxide, carbon and molasses or other carbonaceous binder enables the furnace to deal with a greater quantity of material and wastes less heat than when the reaction mixture is held in boats or saggers. It has now been found that the process is made even more thermally efficient when there are used slugs having a substantially higher density than the spongy slugs of density about 0.7 to 0.9 g./cc. produced using carbonaceous binders for the starting materials as described above.

According, therefore, to the present invention titanium diboride is produced by heating at a temperature of at least 1350° C. a slug having a density of at least 1.1 g./cc. and comprising an intimate mixture of boric oxide, titanium dioxide and carbon; preferably the slug has a density of at least 1.4.

The high density slugs of the invention may be formed by compressing in a mould an intimate mixture of boric oxide, titanium dioxide, and carbon, while said mixture is heated at a temperature which causes softening of the boric oxide. The boric oxide then functions as a binder for the slug, by forming a glassy matrix in which the titanium dioxide and carbon are dispersed. If desired, however, the mixture may include molasses or another carbonaceous binder. The boric oxide can be completely or partly replaced by a substance convertible to boric oxide on heating, for example boric acid may be employed, but in such cases it is highly desirable to effect conversion to boric oxide before compression is applied. For the sake of brevity only boric oxide will in the main be referred to in describing the invention in more detail, but it will be understood that whenever the context permits this term is used to include boric acid and other compounds which yield boric oxide on moderate heating.

In producing the slug, an intimate mixture of the components may be heated in a mould, for example a cylindrical tube, at a temperature sufficient to convert the boric oxide into a glass which serves to bind together the particles of carbon and titanium dioxide. This temperature may be 300°–1000° C., but is preferably 400°–500° C., say 460° C. While the mixture is being heated (and in the case of boric acid after dehydration) it may be subjected to lengthwise compression so as to yield a slug having the desired density. When the heating is complete the slug may then be removed from the mould. If desired a preformed slug of low density may be compressed while heated, for example by confining the slug in a mould with a closed end, which may or may not be the tube in which the slug was originally formed, and applying a pressure through a ram onto the slug of 100–1000 lb./sq. in. The slug can then be pushed from the tube and allowed to cool. Densities of up to 1.8 g./cc. can be attained in these ways.

Instead of, or in addition to, compressing the slug lengthwise as described above, the slug may be compressed laterally from within by driving a pointed cylindrical or other rod through it in an axial direction while it is laterally confined, preferably in the mould in which it is formed. This operation may be carried out at a temperature at which the material of the slug is more or less plastic without being fluid, e.g. at about 400 to 800° C. If desired, the material may also be longitudinally confined, as by the closed end of the mould at one end and at the other by a disc provided with a hole through which the rod can pass. It has been found that a rod of diameter up to about two thirds or even more of that of the slug can be used, and that densities above 1.4, e.g. 1.5–1.7 or 1.8, can be attained. Furthermore the axial space which remains after the rod has been removed also has an advantageous effect as described in copending application Ser. No. 194,215 of Wood, Timms and Bull filed May 10, 1962, now U.S. Patent No. 3,249,401, in that it shortens the time required for the complete conversion of the titanium dioxide to the boride.

The titanium dioxide is preferably employed in the form of anatase but other forms, for example mineral rutile or titanic oxide, may be used. Graphite is the preferred form of carbon; carbon black and other forms of carbon may be used, but it may then be necessary to use an inert atmosphere or lower temperatures to prevent oxidation of the carbon while the slug is being produced.

The boric oxide may be present in the slug in excess over the stoichiometric amount (calculated on the titanium dioxide); for example an excess up to 50% by weight can be tolerated, although it is preferably not more than 5–10% by weight. A slight excess of carbon over the stoichiometric amount is advantageous, but this should not exceed 5% by weight and is preferably 1–3% by weight.

It is important that the materials used in producing the slug are intimately mixed, since otherwise consistently good results are not obtained. Thorough mixing in a ball mill will give a satisfactory mixture.

In the production of titanium diboride by the process of the invention the slugs are heated to temperatures above about 1350° C. and especially 1550°–2000° C. or higher. An inert gas, e.g. argon, may be employed to sweep out the carbon monoxide formed, although it is preferred to carry out the reaction at a temperature well above 1550° C. preferably above 1700° C., in an atmosphere of carbon monoxide and to quench the product as rapidly as possible.

The use of slugs with densities greater than 1.1 g./cc. in making titanium diboride enables a given furnace to produce titanium diboride at a greater rate at any particular temperature than when using lower density slugs. In addition, slugs formed by compression of the heated reaction mixture as described above, are very strong, their strength being comparable with that of graphite electrode stock. This strength is important with solid slugs of large diameter as it prevents the slugs from collapsing when they are fired to form titanium diboride. Strength is also important for the same reason for solid slugs of special shapes such that the slug has a ratio of surface area to solid volume at least 1.5 times as great as that for a solid cylinder of the same length and of diameter equal to the maximum cross sectional dimension of the slug. Such slugs are described in the aforesaid application and may be of tubular, channel, cruciform, star, or semi-circular section, with or without a corrugated surface.

The invention is illustrated in the following examples.

*Example I*

An intimate mixture of graphite, boric acid and anatase was produced by milling together −200 mesh graphite powder and the other components in proportions corresponding to a 1% excess of graphite and a 15% excess of boric acid over the stoichiometric amount.

The mixture dampened with about 8% of water, was packed into a steel tube of internal diameter one and a quarter inches. The filled tube was heated in an oven for 1 hour at 450° C. to dehydrate the boric acid to boric oxide. About 7% of the boric acid in the slug was lost during drying. After an hour, the steel tube, still containing the dehydrated mixture, was removed from the oven. During drying the mixture in the tube had become bound together into a low density slug (density about 0.75 g./cc.) by boric oxide glass. The hot slug in the tube was then compressed with a ram which loosely fitted the tube, under a pressure of 150 lb./sq. in. The slug thus formed was pushed out of the tube and allowed to cool. The density of the slug was 1.55 g./cc.

The formation of titanium diboride from the slug was effected by heating it in an inert atmosphere in an electric resistance furnace containing a 1½ inch bore graphite reaction tube. The slug took 37 minutes to react completely at 1800° C., after which the product was pushed to a cooled part of the reaction tube. After cooling, the product removed from the furnace was a friable grey powder containing 98.1% titanium diboride.

In a parallel experiment, a slug of the same dimensions made in the way described above, but without compression, had a density of only 0.80 g./cc. and took 31½ minutes to react completely at 1800° C.

*Example II*

An intimate mixture of graphite, boric oxide, and anatase was produced by milling together −200 mesh graphite powder and the other components in proportions corresponding to a 1% excess of graphite and a 7% excess of boric oxide over the stoichiometric amounts.

The powder mixture was poured into a 10 inch long aluminium tube of 2 inch bore which had a closed end. A metal plug of diameter 1⅞ inch and weighing 3 lbs. was placed on top of the mixture. The tube and contents were then heated in an oven at 460° C. for 40 minutes, the tube being upright to allow the metal plug to exert pressure on the mixture. After this time, the slug so formed was pushed out of the containing tube. The density of the slug was 1.21 g./cc.

The formation of titanium diboride from the slug was effected in an electric resistance furnace containing a 2½ inch bore graphite reaction tube. The slug was heated in an inert atmosphere in the reaction tube for 50 minutes at 1940° C. At the end of this time the product was pushed into a cooled part of the furnace. The product was a friable grey powder containing 97.5% $TiB_2$.

A second slug, of the same length and diameter, was made from a boric acid mixture without compression as described in Example I. It had a density of only 0.73 g./cc., and took 40 minutes to react completely at 1940° C.

I claim:
1. In the process for producing titanium diboride by heating at a temperature of at least 1350° C. a slug of reactants comprising an intimate mixture of boric oxide, titanium dioxide and carbon, the improvement which comprises employing a preformed slug of reactants having a density of at least 1.1 grams per cubic centimeter.
2. The process of claim 1 in which said preformed slug of reactants has a density of at least 1.4 grams per cubic centimeter.
3. The process of claim 1 in which said preformed slug of reactants comprise particulate titanium dioxide and carbon dispersed in a glassy matrix of boric oxide.
4. The process according to claim 1 in which said preformed slug is cylindrical.
5. In the process for producing titanium diboride by heating at a temperature of at least 1550° C. a slug of reactants comprising an intimate mixture of titanium dioxide, carbon and boric oxide, the improvement which comprises employing a preformed slug of reactants comprising particulate titanium dioxide and carbon dispersed in a glassy matrix of boric oxide having a density of at least 1.4 grams per cubic centimeter.
6. A process for producing titanium diboride which comprises forming a slug of density at least 1.1 g./cc. by compressing in a mould an intimate mixture of boric oxide, titanium dioxide and carbon, while said mixture is heated at a temperature which causes softening of the boric oxide, cooling the slug, removing the cooled slug from the mould, and heating the slug at a temperature of at least 1350° C.

References Cited

UNITED STATES PATENTS

| | | | |
|---|---|---|---|
| 2,364,123 | 11/1941 | Benner et al. | 23—208 |
| 2,371,211 | 3/1945 | Barrington | 106—43 |
| 3,019,084 | 1/1962 | Amstein | 23—204 |
| 3,249,401 | 5/1966 | Wood et al. | 23—204 |

FOREIGN PATENTS

| | | |
|---|---|---|
| 282,748 | 3/1915 | German. |

OTHER REFERENCES

Samsonov, "Borides of Rare Earth Metals," 1959, pp. 31–32.

MILTON WEISSMAN, *Primary Examiner.*

BENJAMIN HENKIN, G. T. OZAKI,
*Assistant Examiners.*